(12) United States Patent
Krejci

(10) Patent No.: US 11,214,167 B2
(45) Date of Patent: Jan. 4, 2022

(54) ENERGY SUPPLY DEVICE FOR A MOTOR VEHICLE

(71) Applicant: Bayerische Motoren Werke Aktiengesellschaft, Munich (DE)

(72) Inventor: Arnaud Krejci, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 158 days.

(21) Appl. No.: 16/600,627

(22) Filed: Oct. 14, 2019

(65) Prior Publication Data

US 2020/0039380 A1 Feb. 6, 2020

Related U.S. Application Data

(63) Continuation of application No. PCT/EP2018/066473, filed on Jun. 20, 2018.

(30) Foreign Application Priority Data

Jun. 21, 2017 (DE) ...................... 10 2017 210 430.9

(51) Int. Cl.
*H02J 7/00* (2006.01)
*B60L 58/13* (2019.01)
*B60L 58/24* (2019.01)
*B60W 10/26* (2006.01)

(52) U.S. Cl.
CPC .............. *B60L 58/13* (2019.02); *B60L 58/24* (2019.02); *B60W 10/26* (2013.01); *B60W 2510/244* (2013.01); *B60W 2510/246* (2013.01)

(58) Field of Classification Search
CPC .... B60L 58/13; B60L 58/24; B60L 2240/525; B60L 2240/545; B60L 2260/22;
(Continued)

(56) References Cited

U.S. PATENT DOCUMENTS

2004/0070353 A1 4/2004 Kayukawa et al.
2010/0288745 A1 11/2010 Brust et al.
(Continued)

FOREIGN PATENT DOCUMENTS

DE 103 46 720 A1 5/2004
DE 10 2006 049 148 A1 4/2008
(Continued)

OTHER PUBLICATIONS

German-language Search Report issued in counterpart German Application No. 10 2017 210 430.9 dated Mar. 12, 2018 with partial English translation (11 pages).
(Continued)

*Primary Examiner* — Zixuan Zhou
(74) *Attorney, Agent, or Firm* — Crowell & Moring LLP

(57) ABSTRACT

An energy supply device for a motor vehicle has a high-voltage energy storage device and a control device for controlling the charging and discharging operations of the high-voltage energy storage device. The control device is designed to determine a temperature of the high-voltage energy storage device and to adjust a predetermined working range of the high-voltage energy storage device, which is defined by an upper limit and a lower limit, as a function of the determined temperature.

9 Claims, 2 Drawing Sheets

(58) Field of Classification Search
CPC .......... B60W 10/26; B60W 2510/244; B60W 2510/246; Y02E 60/10; Y02T 10/70; H01M 10/63; H01M 10/625
USPC .......................................... 320/109; 701/22
See application file for complete search history.

(56) References Cited

U.S. PATENT DOCUMENTS

| 2012/0200257 A1 | 8/2012 | Schwarz et al. |
| 2013/0154653 A1 | 6/2013 | Boehm et al. |
| 2016/0137065 A1 | 5/2016 | Matsubara et al. |

FOREIGN PATENT DOCUMENTS

| DE | 10 2010 001 529 A1 | 8/2011 | | |
| DE | 10 2011 004 357 A1 | 1/2012 | | |
| DE | 10 2013 224 185 A1 | 5/2015 | | |
| DE | 10 2015 119 565 A1 | 5/2016 | | |
| EP | 2 020 724 A1 | 2/2009 | | |
| EP | 2020724 A1 | * 2/2009 | .............. | B60L 58/24 |
| EP | 2 572 951 A1 | 3/2013 | | |
| EP | 3 153 369 A1 | 4/2017 | | |
| JP | 2010-81672 A | 4/2010 | | |

OTHER PUBLICATIONS

International Search Report (PCT/ISA/210) issued in PCT Application No. PCT/EP2018/066473 dated Oct. 18, 2018 with English translation (seven (7) pages).
German-language Written Opinion (PCT/ISA/237) issued in PCT Application No. PCT/EP2018/066473 dated Oct. 18, 2018 (six (6) pages).

* cited by examiner

ENERGY SUPPLY DEVICE FOR A MOTOR VEHICLE

CROSS REFERENCE TO RELATED APPLICATIONS

This application is a continuation of PCT International Application No. PCT/EP2018/066473, filed Jun. 20, 2018, which claims priority under 35 U.S.C. § 119 from German Patent Application No. 10 2017 210 430.9, filed Jun. 21, 2017, the entire disclosures of which are herein expressly incorporated by reference.

BACKGROUND AND SUMMARY OF THE INVENTION

The present invention relates to an energy supply device for a motor vehicle. Furthermore, the present invention relates to a motor vehicle, in particular an automobile, comprising such an energy supply device, and to a method for supplying a motor vehicle with energy.

High-voltage storage units—in particular high-voltage storage units using lithium-ion technology with a rated voltage of greater than or equal to 60 V—can be operated within a predetermined fixed operating range. Said operating range is generally chosen in such a way that, on the one hand, a defined cold start (e.g. start of the internal combustion engine at −25° C.) must be possible at any time (lower state of charge limit/minimum storage capacity) and that, on the other hand, there is (upward) enough storage capacity (upper state of charge limit/maximum storage capacity) to be able to utilize the energy store for braking energy recovery. The fixed operating range is therefore defined with a fixed lower state of charge limit and a fixed upper state of charge limit in order to enable a defined cold start at any time, i.e. under any ambient conditions.

However, such a fixed operating range can give rise to limitations in the utilization of the energy store which are not necessary at every temperature. In this regard, the lower state of charge limit can be lower at hotter temperatures than at colder temperatures.

In order to enable a defined cold start at any time and simultaneously to reduce the limitations for the driver, it is therefore known to fix the operating range depending on an outside temperature. However, the temperature of the energy store itself does not always correspond to the outside temperature, with the result that in this case, too, the operating range or working range is limited, without this being absolutely necessary. In this regard, by way of example, the working range is reduced since a cold outside temperature prevails, even though the actual temperature of the energy store would not necessitate this.

Against this background, it is an object of the present invention to improve the utilization of the operating range of an energy store.

Accordingly, an energy supply device for a motor vehicle is provided, comprising a high-voltage energy storage device and a control device for controlling the charging and discharging processes of the high-voltage energy storage device.

The high-voltage energy storage device can be any kind of energy store which can be used in a motor vehicle. By way of example, the high-voltage energy storage device can be a battery of the motor vehicle. The motor vehicle can be a conventional internal combustion engine vehicle, an electric vehicle or a hybrid vehicle, wherein the high-voltage energy storage device supplies an electric drive machine (electric motor or starter) with energy.

In this case, the control device is configured to determine a temperature of the high-voltage energy storage device and to adapt a predetermined working range of the high-voltage energy storage device, said working range being defined by an upper limit and a lower limit, depending on the determined temperature. Said working range or operating range is generally chosen in such a way that, on the one hand, a defined cold start must be possible at any time (lower state of charge limit/minimum storage capacity) and that, on the other hand, there is (upward) enough storage capacity (upper state of charge limit/maximum storage capacity).

In comparison with shifting the working range depending on the outside temperature, the adaptation depending on the temperature of the high-voltage energy storage device has the advantage that the working range is adapted only when this is actually necessary as a result of the temperature of the high-voltage energy storage device.

By way of example, if the vehicle is parked outdoors at a very low outside temperature, it may be assumed that the vehicle cools down itself. However, if the high-voltage energy storage device is charged, the high-voltage energy storage device remains warm and an adaptation of the working range is not necessary. If only the outside temperature were taken into account here, an adaptation of the working range would be necessary without this being demanded by the high-voltage energy storage device itself. It is precisely this, however, which is prevented by the inventive apparatus.

The respective device, for example control device, can be implemented using hardware technology and/or as software technology. In the case of an implementation using hardware technology, the respective device can be embodied as an apparatus or as part of an apparatus, for example as a computer or as a microprocessor. In the case of an implementation in terms of software technology, the respective device can be embodied as a computer program product, as a function, as a routine, as part of a program code or as an executable object.

In accordance with one embodiment, the control device is configured to receive a present temperature of the high-voltage energy storage device from a temperature sensor. In this case, the temperature sensor can be situated directly at or in the high-voltage energy storage device.

The control device can be configured to receive the present temperature after a predefined period of time after switch-off of the motor vehicle. By way of example, the predefined period of time can be greater than or equal to 6 hours. Preferably, the predefined period of time is a period of time that is long enough to be able to expect the high-voltage energy storage device to cool down.

In accordance with a further embodiment, the control device is configured to adapt the lower limit and/or the predefined period of time depending on at least one operating parameter of the motor vehicle. The at least one operating parameter can be an ambient temperature and/or a motor/engine temperature, for example. These operating parameters will be used in addition to determining the temperature of the high-voltage energy storage device in order for example to adapt the value of the lower limit or to define the period of time after a measurement of the temperature is carried out.

In accordance with a further embodiment, the control device is configured to adapt the working range by adapting the lower limit whilst maintaining the upper limit. That means that the working range is increased or decreased depending on the temperature of the high-voltage energy storage device.

The control device can be configured to adapt the lower limit to a first value if the determined temperature is less than or equal to a predefined temperature threshold value. In this case, the temperature threshold value can lie between −15° C. and −25° C. The first value can also be referred to as a cold value.

In accordance with a further embodiment, the control device is configured to adapt the lower limit to a second value if the determined temperature is greater than the predefined temperature threshold value. Preferably, the first value is higher than the second value.

That means that the lower limit is shifted upward given a temperature of the high-voltage energy storage device below the temperature threshold value (e.g. the minimum energy content SoC min (state of charge) is shifted to 18%) and is shifted downward given a temperature of the high-voltage energy storage device above the temperature threshold value (e.g. the minimum energy content SoC min is shifted to 13%). The working range is thus smaller (for example 82% of the total energy range) in the first case and larger (for example 87% of the total energy range) in the second case.

In accordance with a further aspect, a motor vehicle comprising an energy supply device as described above is provided. The motor vehicle can be an automobile, in particular.

In accordance with a further aspect, a method for supplying a motor vehicle with energy is provided, wherein the motor vehicle comprises a high-voltage energy storage device and a control device for controlling the charging and discharging processes of the high-voltage energy storage device. The method comprises the following steps: determining a temperature of the high-voltage energy storage device, and adapting a predetermined working range of the high-voltage energy storage device, said working range being defined by an upper limit and a lower limit, depending on the determined temperature of the high-voltage energy storage device.

The embodiments and features described for the proposed apparatus are applicable, mutatis mutandis, to the proposed method.

Furthermore, a computer program product is proposed, comprising a program code designed to cause the method explained above to be carried out on a computer.

A computer program product, such as e.g. a computer program device, can be provided or supplied for example as a storage medium, such as e.g. memory card, USB stick, CD-ROM, DVD, or else in the form of a downloadable file from a server in a network. This can be effected in a wireless communication network, for example, by the transmission of a corresponding file with the computer program product or the computer program device.

Further possible implementations of the invention also encompass combinations not explicitly mentioned of features or embodiments described above or below in relation to the exemplary embodiments. In this case, the person skilled in the art will also add individual aspects as improvements or supplementations to the respective basic form of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical or functionally identical elements have been provided with the same reference signs, unless indicated otherwise.

Figure 1:
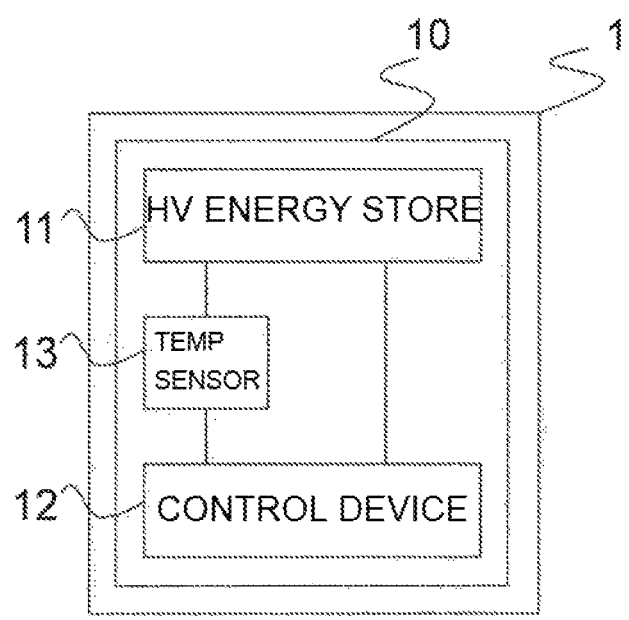
FIG. 1 is a schematic block diagram of a motor vehicle comprising an energy supply device.

FIG. 1 shows a motor vehicle 1 comprising an energy supply device 10. The energy supply device 10 comprises a high-voltage energy storage device 11 for supplying the motor vehicle 1 with energy and a control device 12 for controlling the charging and discharging processes of the high-voltage energy storage device 11.

In order to ensure a reliable cold start of the motor vehicle 1 in all cases, even at low outside temperatures, the control device 12 can adapt the working range of the high-voltage energy storage device 11. For this purpose, the control device 12 firstly determines the present temperature of the high-voltage energy storage device 11. The temperature can be provided by a temperature sensor 13.

The high-voltage energy storage device 11 is operated in a working or operating range that is chosen in such a way that, on the one hand, a defined cold start (e.g. start of the internal combustion engine at −25° C.) must be possible at any time (lower state of charge limit/minimum storage capacity, lower limit hereinafter) and that, on the other hand, there is (upward) enough storage capacity (upper state of charge limit/maximum storage capacity) to be able to utilize the energy store for braking energy recovery.

In order optimally to utilize the working range of the high-voltage energy storage device 11, the control device 12 adapts the working range of the high-voltage energy storage device 11 on the basis of the temperature of the high-voltage energy storage device 11 itself. For the purpose of adapting the working range, a lower limit of the working range of the high-voltage energy storage device 11 is shifted upward or downward.

Figure 2:
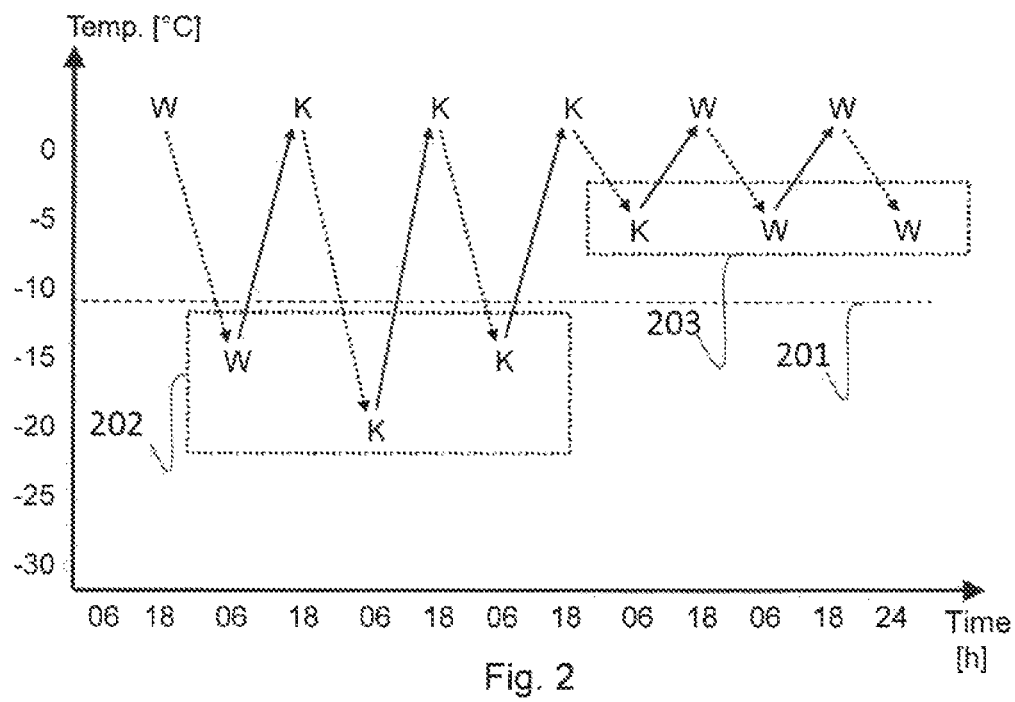
FIG. 2 shows an exemplary sequence of charging of the energy supply device from FIG. 1.

An exemplary sequence of the charging and the shifting of the lower limit is shown in FIG. 2. In this case, the dotted arrows indicate the temperature profile of the high-voltage energy storage device 11 when the vehicle 1 is parked, and the solid arrows indicate the temperature profile of the high-voltage energy storage device 11 during driving.

Firstly, the high-voltage energy storage device 11 is operated with a lower limit of the working range at a value W. In the case of the value W, the lower limit of the working range of the high-voltage energy storage device 11 is set to its minimum value, for example to an energy content of 13%.

If the motor vehicle 1 is parked, the temperature of the high-voltage energy storage device 11 drops. If the temperature here falls below a temperature threshold value 201, the lower limit W is still used in the case of this parking process, but a different lower limit K is then used in the case of the next parking process. After parking, the high-voltage energy storage device 11 is heated up again during driving.

The lower limit K is then used in the case of the next parking process. This lower limit is suitable for lower temperatures since here the lower limit of the working range of the high-voltage energy storage device 11 is set to a higher value, for example to an energy content of 18%. This lower limit K is then used as long as the temperature of the high-voltage energy storage device 11 after parking is in a temperature range 202 lying below the temperature threshold value 201. A different value for the lower limit is used only if the temperature of the high-voltage energy storage device 11 no longer drops to a temperature threshold value 201, but rather is in a higher temperature range 203 above the temperature threshold value. In other words, if a temperature above the temperature threshold value 201 is established after a parking process, the lower limit W is used again for future parking processes until the temperature of the high-voltage energy storage device 11 below the temperature threshold value 201 is established again.

Figure 3:
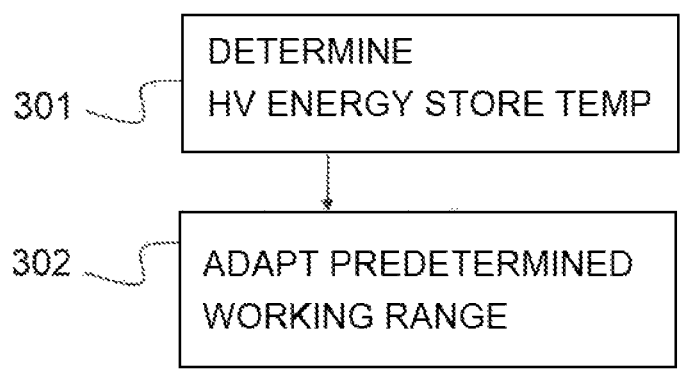
FIG. 3 is a schematic flow diagram of a method for supplying a motor vehicle with energy.

FIG. 3 shows a method for supplying a motor vehicle 1 in accordance with FIG. 1 with energy. The method comprises the following steps.

A first step 301 involves determining a temperature of the high-voltage energy storage device 11.

Afterward, a second step 302 involves adapting a predetermined working range of the high-voltage energy storage device 11, said working range being defined by an upper limit and a lower limit, depending on the determined temperature of the high-voltage energy storage device 11.

The proposed apparatus makes it possible optimally to utilize the working range of a high-voltage energy storage device since, rather than a—possibly irrelevant—outside temperature, the actual temperature of the high-voltage energy storage device is used to adapt a working range of the high-voltage energy storage device.

Although the present invention has been described on the basis of exemplary embodiments, it is modifiable in diverse ways.

REFERENCE SIGNS

1 Motor vehicle
10 Energy supply device
11 High-voltage energy storage device
12 Control device
13 Temperature sensor
201 Temperature threshold value
202, 203 Temperature ranges
301-302 Method steps
K, W Lower limits The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy supply device for a motor vehicle, the energy supply device comprising:
a high-voltage energy storage device; and
a control device for controlling charging and discharging processes of the high-voltage energy storage device,
wherein the control device is configured to:
receive a present temperature of the high-voltage energy storage device from a temperature sensor after a predefined period of time after switch-off of the motor vehicle, and
adapt a predetermined working range of the high-voltage energy storage device based on the present temperature of the high-voltage energy storage device, said working range being defined by an upper limit and a lower limit.

2. The energy supply device according to claim 1, wherein the predefined period of time is greater than or equal to 6 hours.

3. The energy supply device according to claim 1, wherein the control device is further configured to adapt the lower limit and/or the predefined period of time depending on at least one operating parameter of the motor vehicle.

4. The energy supply device according to claim 1, wherein the control device is further configured to adapt the working range by adapting the lower limit whilst maintaining the upper limit.

5. The energy supply device according to claim 1, wherein the control device is further configured to adapt the lower limit to a first value if the present temperature of the high-voltage energy storage device is less than or equal to a predefined temperature threshold value.

6. The energy supply device according to claim 5, wherein the control device is further configured to adapt the lower limit to a second value if the present temperature of the high-voltage energy storage device is greater than the predefined temperature threshold value, wherein the first value is higher than the second value.

7. A motor vehicle comprising an energy supply device according to claim 1.

8. The motor vehicle according to claim 7, wherein the motor vehicle is an automobile.

9. A method for supplying a motor vehicle with energy, wherein the motor vehicle comprises an energy supply device with a high-voltage energy storage device and a control device for controlling charging and discharging processes of the high-voltage energy storage device, the method comprising:
receiving a present temperature of the high-voltage energy storage device from a temperature sensor after a predefined period of time after switch-off of the motor vehicle; and
adapting a predetermined working range of the high-voltage energy storage device based on the present temperature of the high-voltage energy storage device, said working range being defined by an upper limit and a lower limit.

* * * * *